Jan. 24, 1928.

F. KASANTZEFF 1,657,400

STRAIGHT AIR BRAKE

Filed July 21, 1926

Inventor
Florentin Kasantzeff
By B. Singer
atty.

Jan. 24, 1928.  1,657,400
F. KASANTZEFF
STRAIGHT AIR BRAKE
Filed July 21, 1926  3 Sheets-Sheet 2

Inventor
Florentin Kasantzeff
By B. Singer, atty

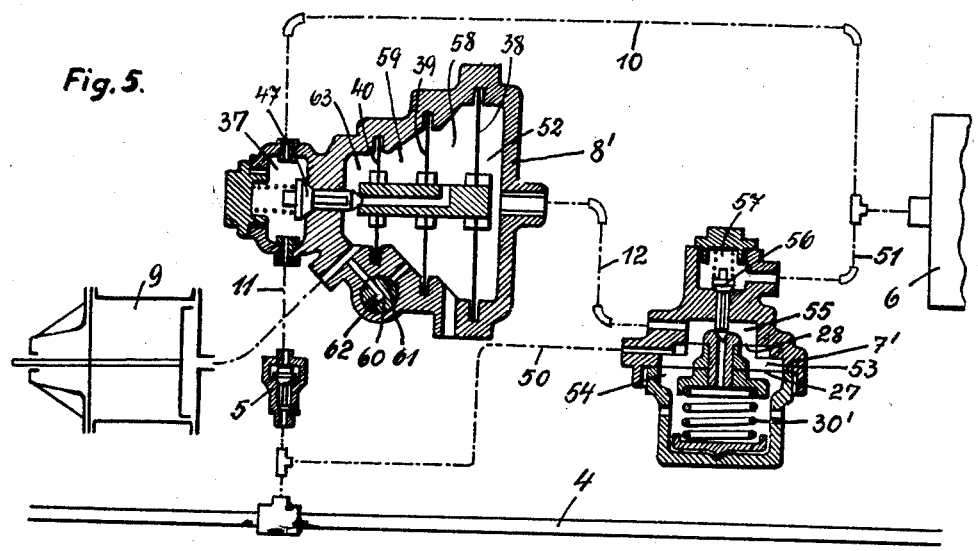
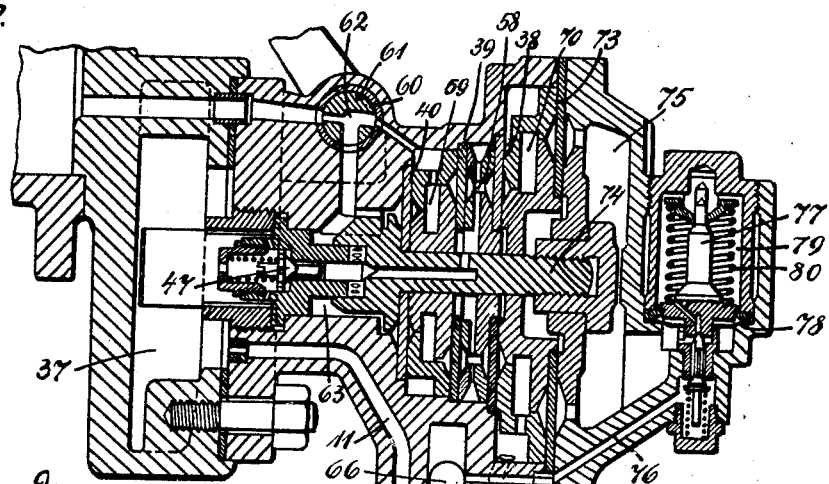
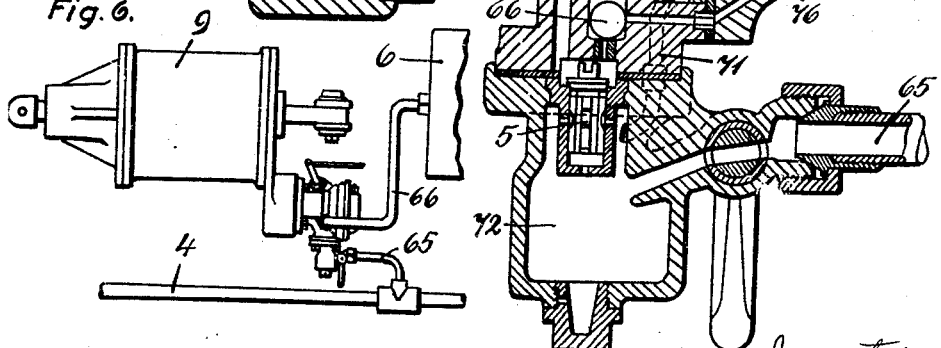

Patented Jan. 24, 1928.

1,657,400

UNITED STATES PATENT OFFICE.

FLORENTIN KASANTZEFF, OF BERLIN, GERMANY.

STRAIGHT-AIR BRAKE.

Application filed July 21, 1926. Serial No. 124,030.

The invention relates to a brake, adapted especially for use in railways, of the one lined straight air type, as for instance known in the brakes of Drelshammer or Bozitch.

The new features reside in means for a direct connection of the brake cylinder to the brake pipe and to the auxiliary air container in such way, that at all times the air pump of the locomotive or other tractor is able to maintain any desired pressure in the whole system, and the danger of exhausting the auxiliary containers by looseness of the brake pistons or other parts is entirely avoided. Thereby any air pressure in applying or lifting the brakes can surely be maintained in a fully automatic manner.

The invention further concerns means, such as an accelerating air chamber, for ensuring a quick action of the brake, especially in approaching the brake blocks to the wheels to be braked, and further details, as later described.

Several samples of the invention are shown in the drawing, in which

Fig. 5 is a diagrammatic view of a second type, the ruling device and distributor being shown is section, Fig. 6 is a diagrammatic view of a third type, and Fig. 7 is a longitudinal section of the combined distributor and ruling device, appertaining thereto.

In all samples corresponding reference letters are used for corresponding parts.

Figure 1:
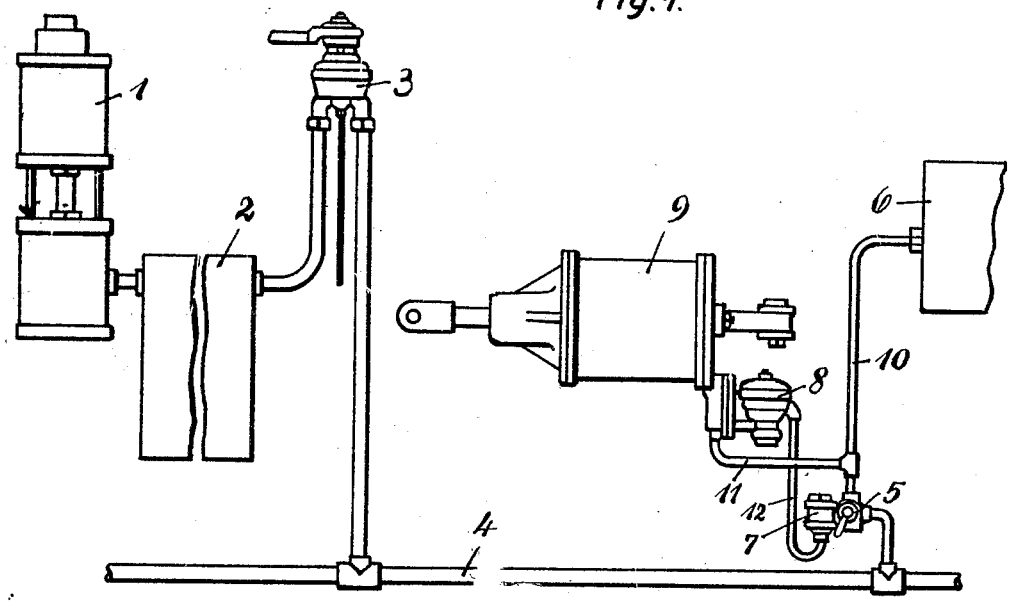
Fig. 1 is a diagrammatic view of a first type.

In the first modification the brake, described in connection with Fig. 1 contains on the locomotive an air pump 1, a main air container 2, and a leader's valve 3, and by a train pipe 4 these parts, which may be of usual construction, are connected to the wagon appliances, which consist of feed valves 5, auxiliary air containers 6, special ruling devices 7, distributors 8, and brake cylinders 9, these parts being connected by connecting tubes 10, 11 and 12 as shown on the drawings.

Figure 2:
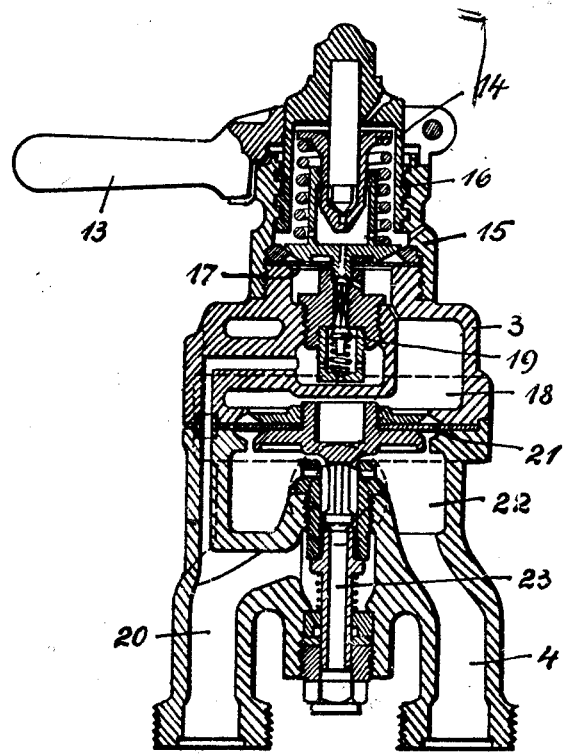
Fig. 2 is a longitudinal section of a leader's valve appertaining thereto.

The leader's valve 3, shown in Fig. 2, is so constructed as to allow any desired grade of air pressure to be obtained and automatically maintained in the train pipe 4. For this purpose, a handle 13, fitted with a screw part 14, is arranged on a corresponding screw part 15 of the valve casing so as to proceed axially when being rotated, and to thereby more or less compress a screw spring 16 inserted between the handle and a diaphragm 17. The lower side of said diaphragm 17 is in connection with an air chamber 18, and a double valve 19 of known construction serves for feeding air from the main container 2 through a connecting channel 20 to said chamber 18 in such way, that in each position of the handle 13 a precisely corresponding air pressure is maintained in said chamber 18.

A larger diaphragm 21 is arranged so as to separate said chamber 18 from a further chamber 22, and a further similar double valve 23 serves to feed this chamber 22 and the train pipe 4, connected thereto, with air under precisely the same pressure as obtained in the chamber 18.

This arrangement gives the possibility of using a small and lightly loaded handle spring, so that the valve can be easily handled and no trouble with the spring arises, and nevertheless, owing to the large dimensions of the second double valve 23, which can be surely governed by the large diaphragm 21, acting as a relay, the desired pressures can be very quickly obtained also in very long train pipes, and maintained against leakages.

The parts arranged on the wagons are described as follows.

Figure 3:
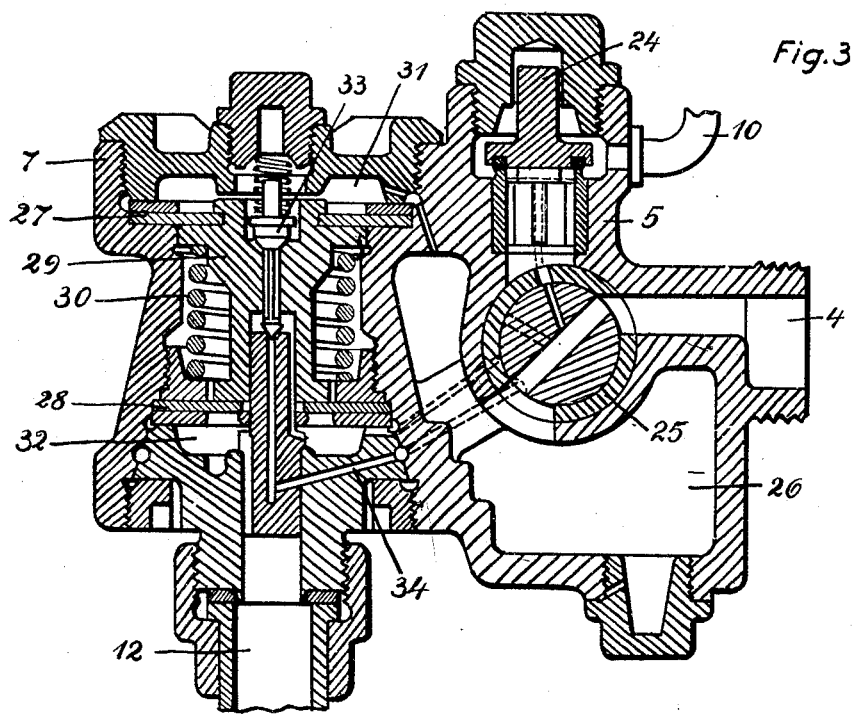
Fig. 3 is a longitudinal section of a ruling device appertaining thereto.

The feed valve 5, shown in Fig. 3, contains an automatic check valve 24 connecting the train pipe 4 to the pipe 10 of the auxiliary container 6 and to the pipe 11 leading to the distributor 8. A valve cone 25 is combined with said check valve so as to give the possibility of shutting off the device or connecting a chamber 26 to the train pipe 4 for the purpose of modifying the pressure alterations.

The ruling device 7, shown in Fig. 3, contains a larger diaphragm 27 and a smaller diaphragm 28 connected to each other by a spindle 29. A screw spring 30 is supported on the casing so as to load the larger diaphragm 27 and press it upward. Above the larger diaphragm 27 a chamber 31 is arranged, which chamber is connected to the train pipe 4. Below the smaller diaphragm 28 a chamber 32 is arranged, which is connected to the governing pipe 12 leading to the distributor 8. A double valve 33 is arranged in the spindle 29 so as to connect the chambers 31 and 32, when the spindle 29 is lowered, and connect the lower chamber 32 to an atmospheric outlet 34, when the spindle 29 is raised.

The areas of the diaphragms 27 and 28, and the tension of the spring 30 are in such relation, that on a normal pressure existing in the train pipe 4 and the chamber 31 also the same pressure is obtained in the lower chamber 32 and in the distributor pipe 12, whereas, when the pressures in the upper chamber 31 are augmented or lowered, the pressures in the lower chamber 32 are augmented or lowered in higher grades. Hereby an accelerated and more precise governing of the distributor 8 is attained.

Figure 4:
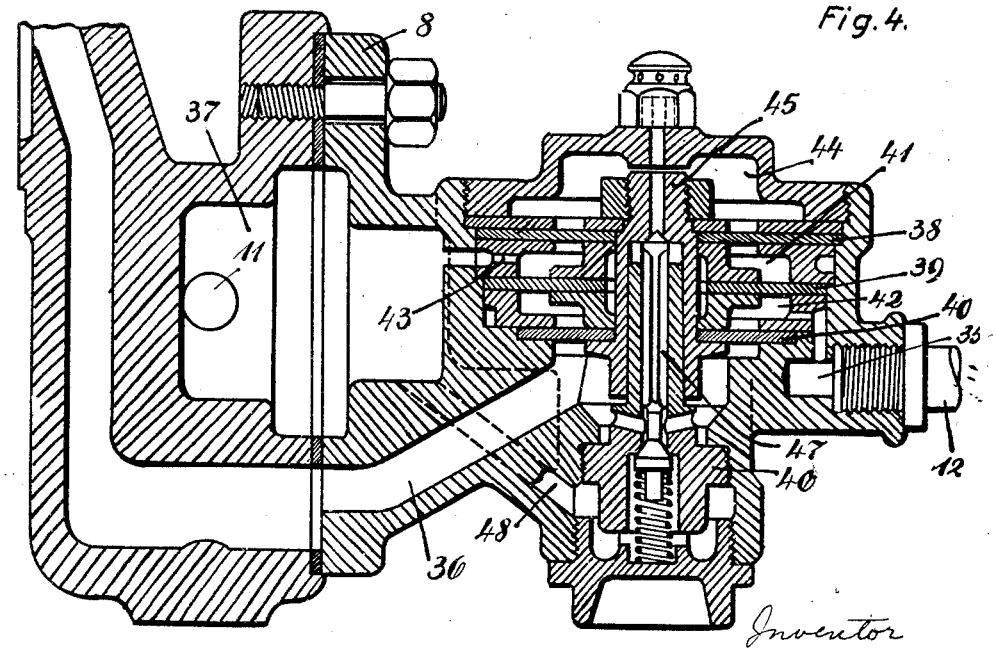
Fig. 4 is a longitudinal section of a distributor appertaining thereto.

The distributor 8, Fig. 4, of an essentially known type, has a channel 35 in connection with the pipe 12 coming from the ruling device 7, a brake cylinder channel 36 and a chamber 37 connected to the pipe 11 which comes from the auxiliary container 6 and feed valve 5. Between three diaphragms 38, 39, 40 two chambers 41 and 42 are included. The upper chamber 41 is connected by a channel 43 to the chamber 37, while the lower chamber 42 communicates with the first named channel 35. Above the uppermost diaphragm 38 an atmospheric chamber 44 is provided, and the space below the lowermost diaphragm 40 is connected to said channel 36 and to the brake cylinder.

The diaphragms are fastened to a spindle 45 so that they form a commonly swinging system. A bolt 46 with a longitudinal bore containing a double valve 47 is so arranged with respect to said spindle 45, as to alternatively connect the brake cylinder channel 36 with the atmospheric chamber 44 and by a connecting channel 48 with the chamber 37 connected to the auxiliary air container 6.

The distributor acts as follows. In the running positions of the leader's valve, from the train pipe the normal pressure is transmitted through the ruling device to the lower chamber 42 and the same pressure exists in the upper chamber 41, whereas the uppermost space 44 and the lowermost channel 36 have atmospheric pressure. When the train pipe pressure is diminished, the diaphragm system goes downward, and air is admitted from chamber 37 through the channel 48 to the brake cylinder. When the train pipe pressure is augmented, the diaphragm system goes upward, and air is exhausted from the brake cylinder through the double valve 47 and the outlet chamber 44. In all cases the chamber 37 has the effect of producing very quickly but smoothly the desired movements of the brake piston, and this in very exact manner owing to the described effect of the ruling device 7.

In the constructional form according to Fig. 5, a feed valve 5 is connected to the train pipe 4 and a pipe 11 leads from said feed valve to a chamber 37 of the distributor 8', which in its turn is connected to the auxiliary container 6 by a pipe 10'. A ruling device 7' is connected to the train pipe by a pipe 50, further to the auxiliary container by a pipe 51, and to the governing chamber 52 of the distributor 8' by a pipe 12.

The ruling device 7' contains two diaphragms 27 and 28 of different sizes (as in Fig. 3), and a loading spring 30' is so arranged as to press the larger diaphragm 27 inward. The space 53 between the diaphragms is connected to the train pipe 4. The space 54 below the larger diaphragm 27 is connected to the atmosphere, and the space 55 above the smaller diaphragm 28 is connected to the above mentioned pipe 12. A double valve 56 is so arranged, that it connects the space 55 alternately to the atmosphere or to a chamber 57, which communicates with the pipe 51 leading to the auxiliary container 6 and to the distributor.

The action is similar to that described as shown in Fig. 3, as follows. When a certain normal pressure exists in the middle chamber 53, atmospheric pressure exists in the upper chamber 55. When the pressure in chamber 53 becomes augmented or diminished, in consequence of the different areas of the diaphragms and due to the spring 30', corresponding pressure differences in an increased degree and in inverse sense are produced in the upper chamber 55 by aid of the double valve 56.

In the appertaining distributor 8' the three diaphragms 38, 39, 40 the air chamber 37 and the double valve 47 are similar to the corresponding parts of Fig. 4. The chamber 58 between the greatest diaphragms 38, 39 is open to the atmosphere. The chamber 59 between the smaller diaphragms 39, 40 is connected to a valve cone 60, which has an atmospheric channel 61 and a connecting channel 62 adapted for connecting the space 59 to the extreme chamber 63 and to the brake cylinder 9.

In the shown position of the valve cone 60 a strong braking action is obtained, as needed for loaded wagons, as follows. The intermediate chambers 58 and 59 being open to the atmosphere, the whole area difference of the greatest diaphragm 38 and the smallest diaphragm 40 is effective for the movement of the diaphragm system, and therefore strong pressure differences and corresponding strong braking actions are produced by the chamber 63. When the valve cone 60 is turned so as to connect the spaces 59 and 63, a weaker braking action is obtained due to the smaller difference of area of the now acting diaphragms 38 and 39; this position is used for unloaded wagons. In each case the double valve 47 has the action of admitting or exhausting air to or from the chamber 63 and the brake cylinder, so that graduated braking or brake loosening according to the pressures produced in the chamber 52 is obtained, whereas in running position all chambers of the distributor as well as the brake cylinder are under atmospheric pressure.

In the modification shown in Figs. 6 and 7, Fig. 6 shows the train pipe 4, the auxiliary container 6 and the brake cylinder 9 in essentially the same arrangement as before described. The feed valve, ruling device and distributor and united in one common device, shown in Fig. 7, which is connected to the train pipe 4 and to the auxiliary container 6 by pipes 65 and 66 respectively.

In Fig. 7 the parts 5, 11, 37, 47, 40, 39, 38, 63, 59, 58, 60, 61, 62 have completely the same arrangement and action as described in connection with Fig. 5. The ruling device is of another type in so far as, instead of augmenting the differences of air pressure induced by the train pipe pressure differences it produces a constant pressure acting against the train pipe pressure differences so that the acting pressure becomes small and the differences great with relation to it, which means that the same effect as described with regard to exact measuring the braking degrees is obtained.

For this purpose a chamber 70, adjoining to the outer face of the greatest diaphragm 38, is connected by a channel 71 to the train pipe 4 by chamber 72 and pipe 65. This chamber 70 is closed by a still greater diaphragm 73, which is connected to the spindle 74 uniting all the diaphragms 73, 38, 39, 40. A further chamber 75, adjoining the outer face of the large diaphragm 73 is filled up with an always constant pressure from the auxiliary container through the pipe 66 and a channel 76, under the action of a constant pressure valve 77. This valve is of the usual double valve type with a governing diaphragm 78, closing the chamber 75 against an atmospheric chamber 79, and with a loading spring 80.

The action is the following. When for braking the train pipe pressure is diminished, the correspondingly diminished pressure in the chamber 70, due to the area difference of the diaphragms 38 and 73 causes the entire system to move against the accelerating chamber 37 under the constant pressure in chamber 75, whereby air from the accelerating chamber 37 and from the auxiliary container and train pipe is allowed to pass into the brake cylinder to such an extent as to restore the balanced primary position of the diaphragm system. When inversely the train pipe pressure is augmented, the inverse actions takes place with the effect of lifting the brake to any desired degree.

I claim:

1. A straight air brake of the one lined type, comprising in combination a train pipe, an auxiliary air container, a brake cylinder, a distributor connected to said train pipe and auxiliary container so as to directly admit air from both said parts to said brake cylinder on a decrease of air pressure in said train pipe, and a ruling device, so connected to said train pipe and distributor, that by different pressures, existing in the train pipe, relatively greater pressure differences become effective in the distributor.

2. A straight air brake of the one lined type, comprising in combination a train pipe, an auxiliary air container, a brake cylinder, a distributor connected to said train pipe and auxiliary container so as to directly admit air from both said parts to said brake cylinder on a decrease of air pressure in said train pipe, and a ruling device, so connected to said train pipe and distributor, that by different pressures, existing in the train pipe, greater pressure differences are produced in the connection between said ruling device and distributor.

3. A straight air brake of the one lined type, comprising in combination a train pipe, an auxiliary air container, a brake cylinder, a distributor connected to said train pipe and auxiliary container so as to directly admit air from both said parts to said brake cylinder on a decrease of air pressure in said train pipe, and a ruling device consisting of two piston like acting members of different areas, operatively connected to each other, a first chamber adjoining to the outer face of the larger of said members and connected to the train pipe, a second chamber adjoining to the outer face of the smaller of said members and connected to the distributor, a spring pressing said greater member outward, and a double valve in operative connection to said members, so that on a decrease or increase of pressure in said first chamber a greater decrease or increase of pressure in said second chamber is produced.

4. A straight air brake of the one lined type, comprising in combination a train pipe, an auxiliary air container, a brake cylinder, a distributor connected to said train pipe and auxiliary container so as to directly admit air from both said parts to said brake cylinder on a decrease of air pressure in said train pipe, and an air chamber common to said train pipe and auxiliary container and connected to said distributor so as to contain an amount of air adapted for initially filling the brake cylinder and for softening the air pressure graduations.

5. A straight air brake of the one lined type, comprising in combination a train pipe, an auxiliary air container, a brake cylinder, a distributor connected to said train pipe and auxiliary container so as to directly admit air from both said parts to said brake cylinder on a decrease of air pressure in said train pipe, an air chamber, air connections of different cross areas between said air chamber and said train pipe and auxiliary container respectively, and a connection between said air chamber and said distributor.

6. A straight air brake of the one lined type, comprising in combination a train pipe, an auxiliary air container, a brake cylinder, a distributor connected to said train pipe and auxiliary container so as to directly admit air from both said parts to said brake cylinder on a decrease of air pressure in said train pipe, two piston like acting members of different areas in said distributor, a chamber connected to the brake cylinder and adjoining the smaller of said members, and valve means adapted to connect the space enclosed between said members alternatively to said brake cylinder and to the atmosphere.

7. A straight air brake of the one lined type, comprising in combination a train pipe, an auxiliary air container, and a leader's valve for admitting air of different pressures to said train pipe and auxiliary container, said leader's valve comprising a piston like acting member, a loading spring on said member, means for altering the tension of said spring, an air chamber adjoining said member, means operatively connected to said member for admitting and exhausting air to and from said chamber so as to balance said member, a second larger piston like acting member adjoining said chamber, a second chamber connected to said train pipe and adjoining said second member, and means operatively connected to said second member for admitting and exhausting air to and from said second chamber so as to balance said second member.

In witness whereof I affix my signature.

FLORENTIN KASANTZEFF.